US008536077B2

(12) United States Patent
LaVietes et al.

(10) Patent No.: US 8,536,077 B2
(45) Date of Patent: Sep. 17, 2013

(54) FLOORING UNDERLAYMENT MEMBRANE

(75) Inventors: Daniel LaVietes, Dallas, TX (US);
David Gladden, Allen, TX (US);
Song-Ping Dai, Ennis, TX (US)

(73) Assignee: Building Materials Investment Corporation, Wilmington, DE (US)

( * ) Notice: Subject to any disclaimer, the term of this patent is extended or adjusted under 35 U.S.C. 154(b) by 867 days.

(21) Appl. No.: 12/344,969

(22) Filed: Dec. 29, 2008

(65) Prior Publication Data

US 2009/0218030 A1 Sep. 3, 2009

Related U.S. Application Data

(60) Provisional application No. 61/022,664, filed on Jan. 22, 2008.

(51) Int. Cl.
*B32B 27/32* (2006.01)
*B32B 5/26* (2006.01)

(52) U.S. Cl.
USPC ............... 442/398; 442/64; 442/65; 442/76; 442/123; 442/124; 442/152; 442/164; 442/168; 442/170; 442/171; 442/180; 442/328; 442/381; 442/391; 442/392; 442/394

(58) Field of Classification Search
USPC ............ 442/124, 381, 391, 392, 64, 65, 76, 442/123, 152, 164, 168, 170, 171, 180, 328, 442/394, 398
See application file for complete search history.

(56) References Cited

U.S. PATENT DOCUMENTS

| 5,208,098 | A | | 5/1993 | Stover |
| 5,308,692 | A | * | 5/1994 | Kennedy et al. .............. 442/327 |
| 5,501,895 | A | | 3/1996 | Finley et al. |
| 5,503,903 | A | * | 4/1996 | Bainbridge et al. .......... 428/182 |
| 5,578,363 | A | | 11/1996 | Finley et al. |
| 5,584,950 | A | | 12/1996 | Gaffigan |
| 5,766,754 | A | | 6/1998 | Fleck et al. |
| 5,868,399 | A | | 2/1999 | Schlüter |
| 5,956,921 | A | | 9/1999 | Fleck et al. |
| 6,077,613 | A | | 6/2000 | Gaffigan |
| 6,093,485 | A | * | 7/2000 | Jaffee ......................... 428/317.1 |
| 6,120,090 | A | * | 9/2000 | Van Ert et al. ................ 296/211 |
| 6,167,668 | B1 | | 1/2001 | Fine et al. |
| 6,562,173 | B1 | | 5/2003 | Collison et al. |
| 6,576,577 | B1 | | 6/2003 | Garner |
| 6,629,340 | B1 | | 10/2003 | Dale et al. |
| 6,676,779 | B2 | | 1/2004 | Hopkins et al. |
| 6,893,752 | B2 | * | 5/2005 | Veeramasuneni et al. .... 428/703 |
| 6,986,229 | B2 | | 1/2006 | Collison et al. |

(Continued)

OTHER PUBLICATIONS

Annual Book of ASTM Standards, Standard Test Method for Tensile Breaking Strength of Paper and Paperboard, D 828-87, pp. 160-162, 1987.

(Continued)

*Primary Examiner* — Andrew Piziali
(74) *Attorney, Agent, or Firm* — Baker & McKenzie LLP

(57) ABSTRACT

Disclosed herein is a flooring underlayment membrane, and associated methods of manufacturing and installing such a membrane, comprising upper and lower nonwoven fiber layers. In one embodiment, the flooring underlayment membrane constructed as disclosed herein may comprise a first nonwoven fiber material, and a second nonwoven fiber material and at least one layer of extrudable thermoplastic resin disposed between and bonding the first and second nonwoven fiber materials.

27 Claims, 1 Drawing Sheet

(56) References Cited

U.S. PATENT DOCUMENTS

| | | |
|---|---|---|
| 2002/0025751 A1 | 2/2002 | Chen et al. |
| 2002/0056500 A1 | 5/2002 | Collison et al. |
| 2003/0134557 A1 | 7/2003 | Collison et al. |
| 2003/0196762 A1 | 10/2003 | Collison et al. |
| 2004/0197544 A1 | 10/2004 | Ramesh et al. |
| 2005/0079314 A1 | 4/2005 | Brodeur et al. |
| 2006/0032170 A1 | 2/2006 | Vershum et al. |
| 2006/0070326 A1 | 4/2006 | Collison et al. |
| 2006/0106124 A1 | 5/2006 | Fink et al. |
| 2006/0141239 A1 | 6/2006 | Gilder |
| 2006/0144012 A1 | 7/2006 | Manning et al. |
| 2006/0179752 A1 * | 8/2006 | Swanson et al. ............. 52/403.1 |
| 2007/0039268 A1 | 2/2007 | Ambrose et al. |
| 2007/0062139 A1 | 3/2007 | Jones et al. |

OTHER PUBLICATIONS

Annual Book of ASTM Standards, Standard Test Method for Linear Dimensional Changes of Nonrigid Thermoplastic Sheeting or Film at Elevated Temperature, D 1204-94, pp. 248-249, 1994.

Annual Book of ASTM Standards, Standard Test Methods for Coated Fabrics, D 751-95 (revised Feb. 1997), pp. 28-44, 1995.

Annual Book of ASTM Standards, Standard Test Method for Thickness of Nonwoven Fabrics, D 5729-95, pp. 839-842, 1995.

Annual Book of ASTM Standards, Standard Test Method for Air Permeability of Textile Fabrics, D 737-96, pp. 231-235, 1996.

Annual Book of ASTM Standards, Standard Test Method for Tearing Strength of Fabrics by Falling-Pendulum Type (Elmendorf) Apparatus, D 1424-96, pp. 373-380, 1996.

Annual Book of ASTM Standards, Standard Test Methods for Backing Fabric Characteristics of Pile Yarn Floor Coverings, D 2646-96, pp. 690-693, 1996.

Annual Book of ASTM Standards, Standard Specification for Chlorinated Polyethylene (CPE) Sheeting for Concealed Water-Containment Membrane, D 4068-96 (revised Sep. 1996), pp. 526-534, 1996.

Annual Book of ASTM Standards, Standard Test Method for Bond Strength of Ceramic Tile to Portland Cement Paste, C 482-02, pp. 1-5, 2002.

Annual Book of ASTM Standards, Standard Test Method for Evaluating Ceramic Floor Tile Installation Systems Using the Robinson-Type Floor Tester, C 627-93 (Reapproved 1999), pp. 1-5, 1993.

Annual Book of ASTM Standards, Standard Test Methods for Water Vapor Transmission of Materials, E 96-00 (Revised Mar. 2002), pp. 1-8, 2000.

2006 TCA Handbook for Ceramic Tile Installation, 43rd Edition—The Industry Guide for Installation Practices; The Tile Council of North America, Inc., pp. 1-76.

American National Standard Specifications for the Installation of Ceramic Tile, Material & Installation Standards; ANSI A118.10—1999 [Reaffirmed 2005] Load Bearing, Bonded, Waterproof Membranes for Thin-set Ceramic Tile and Dimension Stone Installation, pp. 122-126 and 130.

American National Standard Specifications for the Installation of Ceramic Tile, Material & Installation Standards; ANSI A118.12—2005 [New] Crack Isolation Membranes for Thin-set Ceramic Tile and Dimension Stone Installation, pp. 131-137 and 150-151.

* cited by examiner

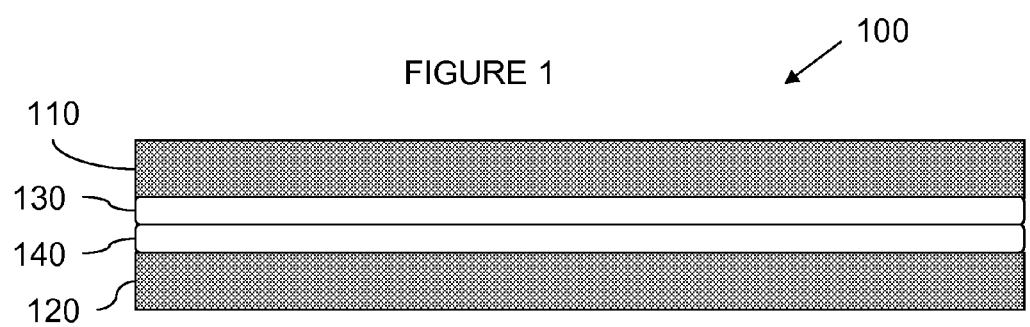
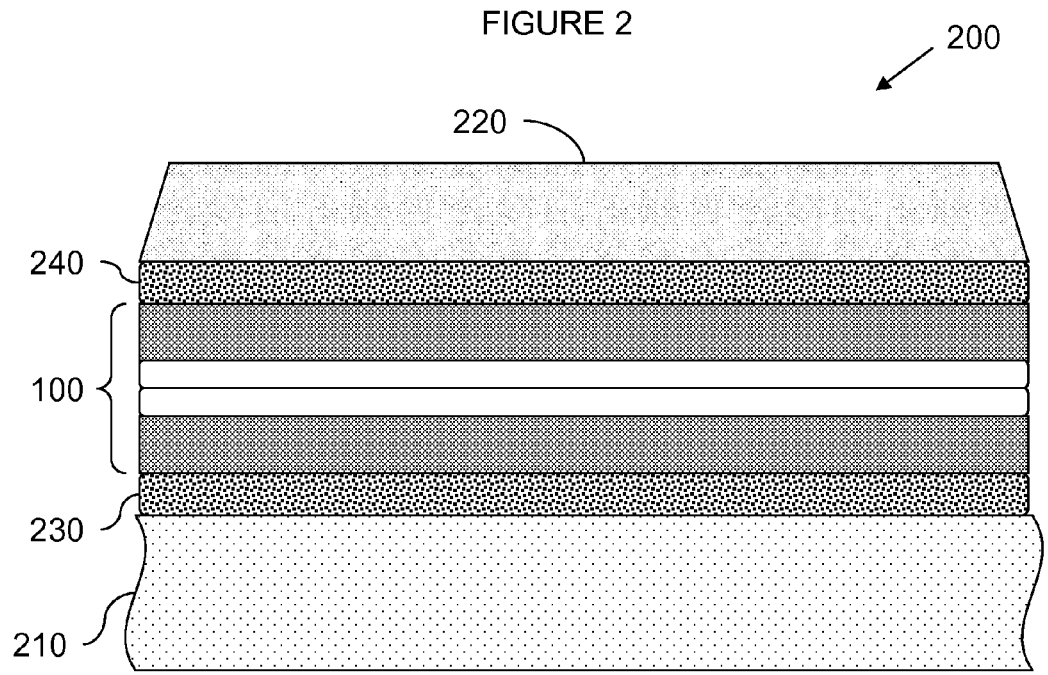

FLOORING UNDERLAYMENT MEMBRANE

PRIORITY CLAIM AND RELATED APPLICATION

The present disclosure claims priority to U.S. Provisional Patent Application No. 61/022,664, entitled "Flooring Underlayment Membrane" and filed Jan. 22, 2008, which is incorporated herein by reference in its entirety for all purposes.

TECHNICAL FIELD

Disclosed embodiments herein relate generally to materials underlying tile or other similar flooring, and more particularly to a flooring underlayment membrane comprising upper and lower nonwoven fiber layers.

BACKGROUND

Tile and stone floors are typically quite expensive for both materials and the labor required for their installation. Since replacement of an entire floor or even individual tiles or stones is relatively costly, standards for materials and installation methods are provided to the industry by The Tile Council of North America (TCNA). This organization references American National Standard Institute (ANSI) test standards, which in turn use American Society for Testing and Materials (ASTM) test methods.

Tile and stone floors are typically installed in areas prone to wetness, such as bathrooms, kitchens and laundry rooms, and often directly on an on-grade or below-grade concrete slab. Such slabs are often sources of moisture or moisture vapor that can be very detrimental to the flooring installation. More specifically, in many locations in the United States, concrete slabs for houses and other building are poured directly on the ground. With shifting soil and expansion and contraction of the ground during rainy and very dry periods, it is very common for foundation slabs to develop cracks. Unfortunately, in cases where tiles or stones are directly adhered to the concrete slab, the tiles, stone or other flooring, and/or the mortar placed therebetween, will also typically crack. Such cracking often results in requiring replacement of the floor or costly remedial work on portions of the flooring.

In order to avoid installation problems due to moisture and concrete cracks, Tile Council of North America recommends the use of specially designed membranes (underlayments), which must pass very stringent test requirements of ANSI A118-10 Load Bearing, Bonded, Waterproof Membranes for Thin-set Ceramic Tile and Dimension Stone Installation and ANSI A118.12 Crack Isolation Membranes for Thin-set Ceramic Tile and Dimension Stone Installation, respectively. Waterproof Membranes and Crack Isolation Membranes are separate entities, with some installations requiring the use of both types.

SUMMARY

Disclosed herein is a flooring underlayment membrane, and associated methods of manufacturing and installing such a membrane, comprising upper and lower nonwoven fiber layers. The disclosed underlayment membrane is qualified per TCNA as a combined waterproof membrane and crack isolation membrane, having passed all ANSI A118.10 and A118.12 tests.

In one embodiment, a flooring underlayment membrane constructed as disclosed herein may comprise a first nonwoven fiber mat, a second nonwoven fiber mat and at least one layer of extrudable thermoplastic resin disposed between and bonding the first and second nonwoven fiber mats. In addition, when wet-laid synthetic fibers are used for the first and second mats, the membrane has a moisture vapor emission rate of less than 3 lb/1000 ft$^2$/24 hr, when measured with a relative humidity gradient from 100% R.H. to 0% R.H.

In another embodiment, a method of manufacturing a flooring underlayment membrane is disclosed. Such a method may comprise providing a first polymer latex-bound nonwoven fiber mat, and applying by extrusion at least one layer of thermoplastic extrusion resin on an exposed surface of the first nonwoven fiber mat. In addition, the method then includes pressing a second polymer latex-bound nonwoven fiber mat into the exposed surface of the at least one layer of thermoplastic resin while still hot. This results in forming a laminate having the extrudable thermoplastic resin disposed between and bonding the first and second nonwoven fiber mats.

In a further embodiment, a method of installing tile flooring is disclosed. An exemplary method may comprise applying a first adhesive (e.g., mortar, etc.) layer directly to a subfloor, such as concrete or wood subflooring. The method may then include laying out a multi-layer underlayment membrane over the first adhesive layer before the first adhesive layer has dried or cured. In such an embodiment, the membrane comprises a first nonwoven fiber mat, a second nonwoven fiber mat, and at least one layer of extrudable thermoplastic resin disposed between and bonding the first and second nonwoven fiber mats. The exemplary method of installation may then comprise applying a second adhesive layer directly to the membrane, and placing tiles onto the second adhesive layer before the second adhesive layer has dried or cured.

BRIEF DESCRIPTION OF THE DRAWINGS

For a more complete understanding of this disclosure, and the advantages of the systems and methods herein, reference is now made to the following descriptions taken in conjunction with the accompanying drawings, in which:

FIG. 1 illustrates an exemplary embodiment of an underlayment membrane constructed according to the disclosed principles; and FIG. 2 illustrates a side view of one embodiment of a flooring installation incorporating an underlayment membrane constructed as disclosed herein.

DETAILED DESCRIPTION

An underlayment membrane constructed as disclosed herein is a light-weight membrane that may be manufactured and supplied in roll form. The membrane contains no hazardous materials and is ready to use, as compared to liquid membranes, which generally contain solvents and require special safety equipment to apply, as well as prolonged drying and curing times.

The underlayment membrane may be composed of fibrous synthetic nonwoven top and bottom layers, which readily bond to standard mortars and adhesives used in the flooring industry. The nonwoven layers, when manufactured by the wet-laid method with wet-web binder saturation, are very uniform in properties. Bonding of these nonwoven layers by means of extrusion of thermoplastic resins results in the uniformity of the underlayment membrane. However, in other embodiments, the nonwoven fiber materials in one or both layers may comprise dry-laid nonwoven fibers.

In application, the underlayment membrane is first adhered to the underlying surface of the room, such as the concrete slab in a slab foundation structure, the mortar or adhesive is allowed to dry and cure, a layer of mortar or adhesive is applied to the top surface of the underlayment, then tile or stone floor covering is placed down. This underlayment membrane may also be loose-laid on concrete and wood subflooring. Moreover, the disclosed underlayment membrane is qualified per TCNA as a combined waterproof membrane and crack isolation membrane, having passed all ANSI A118.10 and A118.12 tests.

Manufacture of the Nonwoven Fiber Mat:

To manufacture the nonwoven fiber material, which serves as the two outer layers of the underlayment membrane, a wet-laid process may be employed. More specifically, a synthetic fiber furnish, composed of 60% 1.5 denier ½" & ¼" blend Type 103 polyester fiber and 40% 6 denier ½" Type 103 polyester fiber, is dispersed in a pulper. Also in the pulper may be dispersed minor amounts of dispersant and viscosity modifier, commonly used in wet-laid mat manufacturing.

A web was formed on a Deltaformer® (Sandy Hill Corporation) and wet-web saturated with a blend of 98.9% Rhoplex® GL-618 Acrylic Latex (Rohm and Haas Company) and 1.1% Zinc Omadine (Arch Chemicals, Inc.) to a binder level of 25% of the total weight of the mat. The web was then dried using conventional gas-fired ovens and wound into large diameter rolls using a conventional winder. The basis weight of the dried mat was 1.9 oz/yd$^2$ (65 g/m$^2$). Of course, the specific materials disclosed herein and provided by the above-noted specific companies are only exemplary, and therefore other similar materials, such as glass fibers and natural fibers, and dry-laid processes, such as carding, needling and spunbonding, may also be employed without departing from the scope of the presently disclosed principles.

Manufacture of the Complete Underlayment Membrane:

Once a nonwoven material such as the one described above has been manufactured, the complete underlayment membrane may be manufactured using an additional process. For example, FIG. 1 illustrates an exemplary embodiment of an underlayment membrane 100 constructed according to the disclosed principles. The underlayment membrane 100 includes two distinct nonwoven mats 110, 120, which in an advantageous embodiment may be constructed of polyester fibers. Of course, fiber glass or other construction materials, in combination with synthetic fibers, may also be employed.

The underlayment membrane 100 may then be manufactured by applying, for example by extrusion, a total of about 2.9 oz/yd$^2$ (98 g/m$^2$) of modified polyethylene resin in two passes. Specifically, these passes of resin may each be layers of modified polyethylene thermoplastic resin 130, 140, as illustrated in FIG. 1. In a specific embodiment, the thermoplastic resin layers 130, 140 may each be extruded respectively on each of the two nonwoven mats 110, 120 illustrated in FIG. 1, and then the two nonwoven mats 110, 120 combined together at the resin surfaces 130, 140, during the second extrusion step.

In accordance with the disclosed principles, the resin layers 130, 140 of the underlayment membrane 100 serve several purposes. Specifically, these layers 130, 140 bond the two layers of nonwoven material 110, 120 together to reduce the moisture vapor transmission rate of the underlayment membrane 100 to levels suggested or deemed necessary by the floor covering industry. In addition, resin layers 130, 140 elongate (e.g., stretch) with the nonwoven material layers 110, 120 to prevent cracking of the tiles or mortar when the concrete subfloor develops cracks.

In a more specific embodiment, about 1.5 oz/yd$^2$ (51 g/m$^2$) Elite XUS 59900 Resin (Dow Chemical Company) may be applied as the first layer 130 to one surface of one of the nonwoven mats 110 using, for example, a single screw extruder at a barrel temperature of about 580° F. A second layer 140 of about 1.4 oz/yd$^2$ (47 g/m$^2$) Elite XUS 59900 Resin may then be applied in a similar manner to one surface of the second nonwoven mat 120. The result is an upper and a lower layer of the nonwoven material 110, 120, joined by the molten resin layers 130, 140, where the two mats 110, 120 may be joined by means of a pressure nip. Of course, other similar resin materials, as well as other means by which to join the two nonwoven mats 110, 120 together, may also be used without departing from the scope of the presently disclosed principles.

Test Results on Exemplary Underlayment Membranes:

The results of physical tests performed on a flooring underlayment membrane manufactured in accordance with the examples discussed above are shown in Table I, which is presented below.

TABLE I

Physical Test Properties of Example II Underlayment Membrane

| Property | Reference | Example II |
|---|---|---|
| Basis Weight (oz/yd$^2$) | ASTM D2646 | 6.7 |
| Thickness (mil) | ASTM D5729 | 26 |
| Frazier Porosity (cfm/ft$^2$) | ASTM D737 | <1.0 |
| Tensile Strength (lb/1" width) MD/CD | ASTM D828 | 67/38 |
| Elongation at Break (%) MD/CD | ASTM D828 | 24/25 |
| Elmendorf Tear (gram) MD/CD | ASTM D1424 | 716/719 |
| Moisture Vapor Emission Rate (lb/1000 ft$^2$/24 hr) | ASTM E96 | 2.5 |
| [100% RH to 0% RH] (Perm) | | 0.5 |

Most of the TCNA tests of the underlayment membrane were performed on a concrete-membrane-tile assembly, in which the membrane was fully adhered to both the concrete and underside of the tile, according to ANSI A118.10 and A118.12 specified procedures. GAF-Elk VersaShield® Seam Tape was used for seaming of the membrane, where required.

For the TCNA tests, tile assemblies were prepared by spreading a mixture of Mapei Kerabond Dry-Set mortar and Mapei Keralastic Flexible Mortar Latex Additive (Mapei Corporation) over a concrete base with a ¹⁄₁₆"×¹⁄₁₆" square notched trowel per the manufacturer's instructions. The underlayment membrane was laid on top and rolled with a 25 lb roller. After a 24 hour cure time, the same mortar mix was applied with a ¼"×¼" square trowel. Ceramic tiles having dimensions of 8"×8" were applied and pressed down on to the mortar mix. For testing requiring assembly specimens larger than one tile, Mapei Keracolor-S sanded grout (Mapei Corporation) was forced into ¼" grout joints with a rubber float, following a 24 hour wait period for the tiles to set. All assemblies were then cured for 28 days, with the exception of Shear Strength test specimens, which were cured for 7 days. Tile Council of North America test results are shown below in Table II.

TABLE II

TCNA Tests of Underlayment Membrane with Ceramic Tile

| Test Property | Test Specimen | Reference | Results |
|---|---|---|---|
| Fungus Resistance | Membrane | ANSI A118.10 | Pass |
| Seam Strength | Membrane + Tape | A118.10, ASTM D751 | Pass |
| Breaking Strength | Membrane | A118.10, ASTM D751 | Pass |
| Dimensional Stability | Membrane | A118.10, ASTM D1204 | Pass |
| Waterproofness | Membrane | A118.10, ASTM D4068-A2 | Pass |
| Shear Strength | Assembly | A118.10, A118.12, ASTM C482 | |
| 7-Day Dry | | | Pass |
| 7-Day Water Immersion | | | Pass |
| 4-Week Dry | | | Pass |
| 28-Day Accelerated Aging @ 140° | | | Pass |
| 12-Week Dry | | | Pass |
| 100-Day Water Immersion | | | Pass |
| Point Load | Assembly | ANSI A118.12 | Pass |
| System Crack Resistance | Assembly | A118.12 | Std Performance |
| Robinson Floor Test | Assembly | A118.12, ASTM C627 | Light Commercial |

A second set of assemblies were also prepared with quarry tile, adhering the underlayment membrane to the concrete base with VersaShield® DS Tape, a double-sided tape. The quarry tile was then bonded to the top surface of the underlayment membrane using the Mapei mortar system described above for ceramic tile. Tile Council of North America test results are shown below in Table III.

TABLE III

TCNA Tests of Underlayment Membrane with Quarry Tile

| Test Property | Test Specimen | Reference | Results |
|---|---|---|---|
| System Crack Resistance | Assembly | A118.12 | High Performance |
| Robinson Floor Test | Assembly | A118.12, ASTM C627 | Extra Heavy |

As disclosed above, the present disclosure provides a flooring underlayment membrane for use with various types of rigid flooring, such as tiles, stone, slate, and the like. In advantageous embodiments, the underlayment membrane is comprised of two outer layers of nonwoven fiber mat and at least one inner layer of extrudable thermoplastic resin binding the outer nonwoven mats together. In some embodiments, the mats are synthetic fibers mats, such as a polymer latex-bound wet-laid synthetic fiber mat. In such embodiments, the synthetic fibers may be selected from the group of polyester, nylon, polypropylene, polyethylene and combinations of these fibers. Moreover, the synthetic fiber mats may contain minor portions of glass fibers and/or natural fibers, such as wood pulp.

In exemplary wet-laid embodiments constructed using synthetic fibers, the synthetic fibers may be about 65% to about 85% of the total mat weight. For embodiments where a polymer latex is employed, the polymer latex may be chosen from the group of acrylic latex, styrene-butadiene latex, nitrile latex and polychloroprene latex. More specifically, the acrylic latex may comprise an amount of about 15% to about 35% of the total mat weight. Accordingly, where the synthetic fiber in the synthetic fiber mat are polyester fibers, they may comprise about 65% to about 85% of the total mat weight, and the polymer latex in the synthetic fiber mat is an acrylic latex in an amount of about 15% to about 35% of the total mat weight. Also, fibers selected may be chopped fibers or they may be continuous fiber strands, such as those used spunbond process.

In related embodiments, the synthetic fiber mat contains a fungicide in the amount of about 0.1% to about 1.0% of the total mat weight. For example, the fungicide in the synthetic fiber mat may be Zinc Omadine. In some embodiments, the basis weight of each nonwoven layer of the synthetic fiber mat weighs about 1.4 ounces per square yard to about 2.4 ounces per square yard. In addition, natural fibers that may be included in the fiber mat may be chosen from cellulose wood pulp or other natural materials. Of course, various combinations of the above selections may be implemented.

In other embodiments, such as dry-laid fiber mats, the fibers may be about 95% to about 100% of the total mat weight. In more specific embodiments, the fibers in such dry-laid mats include some or all synthetic fibers. Moreover, as before selected fibers may be chopped fibers or they may be continuous fiber strands, such as those used spunbond process. As before, the dry-laid fibers may be chosen from the group of polyester, polypropylene, polyethylene and combinations thereof for synthetic fibers, or may be chosen from cellulose wood pulp or other natural materials when natural fibers are employed. As with wet-laid fibers, various combinations of the above selections may be implemented for dry-laid fibers as well.

For some embodiments of the underlayment membrane, the extrudable thermoplastic resin may be chosen from the group of polyethylene, enhanced polyethylene, polyethylene copolymers, polypropylene, polypropylene copolymers, polyolefins, polyvinyl chloride, polyvinylidene chloride and mixtures thereof. Moreover, the total weight of extrudable thermoplastic resin may be about 2.5 ounces per square yard to about 3.5 ounces per square yard. In addition, the underlayment membrane may be constructed having two inner layers of extrudable thermoplastic resin.

In advantageous embodiments, the underlayment membrane has a moisture vapor emission rate of less than 3 lb/1000 ft$^2$/24 hr, when measured with a relative humidity gradient from 100% R.H to 0% R.H.

To construct an underlayment membrane, a manufacturing process may comprise synthetic fibers and wet end chemicals dispersed in a pulper, the fiber slurry formed into a web on a moving wire, about one-half the water in the web removed by vacuum boxes, the web saturated with polymer latex binder and dried in an oven to form a polymer latex-bound synthetic fiber mat, which is wound into a roll. A dry-laid manufacturing process, such as carding, needling, Rondo-webbing or spunbonding, may be used to manufacture the synthetic fiber mat.

The roll of synthetic fiber mat may be unwound and one or more layers of thermoplastic extrusion resin applied by extrusion. Then, a second roll of the synthetic fiber mat is pressed to the hot exposed surface of the thermoplastic resin to form a laminate with outer layers of synthetic fiber mat and one or more inner layers of thermoplastic resin. As discussed above, installation of appropriate flooring, such as ceramic tile, may be accomplished with the disclosed waterproof and crack-isolation underlayment membrane.

Turning now to FIG. 2, illustrated is a side view of one embodiment of a flooring installation 200 incorporating an underlayment membrane 100 constructed as disclosed herein. Such an installation 200 may comprise installing the membrane 100 between the concrete 210 or other subflooring and tiles 220.

In an exemplary structure and related process, the installation 200 is achieved by first spreading an adhesive on the subflooring 210. In one embodiment, the adhesive may be a first mortar layer 230 applied to the subflooring 210. The membrane 100 may then be laid on the subflooring adhesive layer 230 and spread across the area to be covered. Next, a second adhesive layer 240 may be applied on top of the laid membrane 100. In a specific embodiment, the mortar adhesives 230, 240 may be Kerabond (w/Keralastic) Thinset Mortar, which is typically available in most locations. Of course, other similar adhesives may also be employed. Finally, the upper flooring, such as ceramic tile 220, is laid on top of the second adhesive layer 240, and consequently on top of the membrane 100. Once the installation has cured, the membrane 100 provides the combined waterproof and crack isolation benefits discussed in detail above, typically exceeding the benefits provided by conventionally designed and constructed membranes.

While various embodiments of the apparatuses, systems and methods constructed according to the principles disclosed herein are disclosed herein and have been described above, it should be understood that they have been presented by way of example only, and not limitation. The breadth and scope of the invention(s) should thus not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in the claims found herein. Multiple inventions are set forth according to the limitations of the multiple claims associated with this disclosure, and the claims accordingly define the invention(s), and their equivalents, that are protected thereby. In all instances, the scope of the claims should not be constrained by the headings set forth herein.

What is claimed is:

1. A flooring underlayment membrane, comprising:
a first nonwoven fiber mat;
a second nonwoven fiber mat; and
at least one layer of extrudable thermoplastic resin disposed between and bonding the first and second nonwoven fiber mats, wherein
the first and second nonwoven fiber mats comprise a polymer latex bound wet-laid synthetic fiber,
the at least one layer of extrudable thermoplastic resin is operable to elongate with the first and second nonwoven fiber mats such that the membrane passes an ANSI A118.12 test, and
the membrane has a non-zero moisture vapor emission rate of less than 3 lb/1000 ft$^2$/24 hr, when measured with a relative humidity gradient from 100% R.H. to 0% R.H.

2. The underlayment membrane of claim 1, wherein the synthetic fiber is chosen from the group of polyester, nylon, polypropylene, polyethylene and combinations thereof.

3. The underlayment membrane of claim 2, wherein the synthetic fiber mats contain portions of glass fibers.

4. The underlayment membrane of claim 2, wherein the synthetic fiber mats contain portions of natural fibers.

5. The underlayment membrane of claim 2, wherein the fiber in the first and second fiber mats is polyester fiber in an amount of about 65% to about 85% of each total mat weight.

6. The underlayment membrane of claim 2, wherein the polymer latex is chosen from the group of acrylic latex, styrene-butadiene latex, nitrile latex and polychloroprene latex.

7. The underlayment membrane of claim 1, wherein the polymer latex of the first and second fiber mats is an acrylic latex in an amount of about 15% to about 35% of each total mat weight.

8. The underlayment membrane of claim 7, wherein the fiber in the first and second fiber mats is polyester fiber in an amount of about 65% to about 85% of each total mat weight.

9. The underlayment membrane of claim 8, wherein the first and second fiber mats further contain a fungicide in the amount of about 0.1% to about 1.0% of each total mat weight.

10. The underlayment membrane of claim 9, wherein the fungicide is Zinc Omadine.

11. The underlayment membrane of claim 8, wherein the basis weight of each of the first and second fiber mats weighs about 1.4 ounces per square yard to about 2.4 ounces per square yard.

12. The underlayment membrane of claim 10, wherein the basis weight of each of the first and second fiber mats weighs about 1.4 ounces per square yard to about 2.4 ounces per square yard.

13. The underlayment membrane of claim 1, wherein the extrudable thermoplastic resin is chosen from the group of polyethylene, enhanced polyethylene, polyethylene copolymers, polypropylene, polypropylene copolymers, polyolefins, polyvinyl chloride, polyvinylidene chloride and mixtures thereof.

14. The underlayment membrane of claim 13, wherein the total weight of extrudable thermoplastic resin in about 2.5 ounces per square yard to about 3.5 ounces per square yard.

15. The underlayment membrane of claim 14, wherein the at least one layer of extrudable thermoplastic resin disposed between and bonding the first and second nonwoven fiber mats comprises two layers of extrudable thermoplastic resin.

16. The underlayment membrane of claim 1, wherein the fibers in the first and second fiber mats are in the amount of about 95% to about 100% of each total mat weight.

17. The underlayment membrane of claim 16, wherein the fibers are synthetic fibers.

18. The underlayment membrane of claim 17, wherein the synthetic fibers are chosen from the group of polyester, polypropylene, polyethylene and combinations thereof.

19. A method of manufacturing a flooring underlayment membrane, the method comprising:
providing a first polymer latex-bound nonwoven fiber mat;
applying by extrusion at least one layer of thermoplastic extrusion resin on an exposed surface of the first nonwoven fiber mat; and
pressing a second polymer latex-bound nonwoven fiber mat into the exposed surface of the at least one layer of thermoplastic resin while still hot to form a laminate having the extrudable thermoplastic resin disposed between and bonding the first and second nonwoven fiber mats, wherein
the first and second nonwoven fiber mats comprise a polymer latex bound wet-laid synthetic fiber,
the at least one layer of extrudable thermoplastic resin is operable to elongate with the first and second nonwoven fiber mats such that the membrane passes an ANSI A118.12 test, and
the membrane has a non-zero moisture vapor emission rate of less than 3 lb/1000 ft$^2$/24 hr, when measured with a relative humidity gradient from 100% R.H. to 0% R.H.

20. The method of claim 19, wherein the fibers in the first and second fiber mats are polyester fiber in an amount of about 65% to about 85% of each total mat weight, and wherein the polymer latex in the first and second fiber mats is an acrylic latex in an amount of about 15% to about 35% of each total mat weight.

21. The method of claim 20, wherein the extruded thermoplastic resin is chosen from the group of polyethylene, enhanced polyethylene, polyethylene copolymers, polypropylene, polypropylene copolymers, polyolefins, polyvinyl chloride, polyvinylidene chloride and mixtures thereof.

22. The method of claim 19, further comprising first applying by extrusion a first layer of thermoplastic extrusion resin on an exposed surface of the first nonwoven fiber mat, then applying by extrusion a second layer of thermoplastic extrusion resin on an exposed surface of the second nonwoven fiber mat, the pressing comprising pressing the layer of resin on the first mat into the layer of resin on the second mat while the second resin layer is still hot.

23. The underlayment membrane of claim 2, wherein the synthetic fiber comprises 60% 1.5 denier ½" & ¼" blend polyester fiber and 40% 6 denier ½" polyester fiber.

24. The underlayment membrane of claim 23, wherein the first and second nonwoven fiber mats further comprise an acrylic resin latex in an amount of about 25%.

25. The underlayment membrane of claim 23, wherein the first and second nonwoven fiber mats each have a basis weight of about 1.9 oz/yd$^2$.

26. The underlayment membrane of claim 1, wherein the membrane has a moisture vapor emission rate of less than 2.5 lb/1000 ft$^2$/24 hr, when measured with a relative humidity gradient from 100% R.H. to 0% R.H.

27. The underlayment membrane of claim 1, wherein the total weight of extrudable thermoplastic resin is about 2.5 ounces per square yard to about 3.5 ounces per square yard.

* * * * *